UNITED STATES PATENT OFFICE.

JOSEPH A. GREER, OF GALVESTON, TEXAS.

COMPOUND FOR THE MANUFACTURE OF ARTIFICIAL STONE.

SPECIFICATION forming part of Letters Patent No. 269,849, dated January 2, 1883.

Application filed July 3, 1862. (No specimens.)

*To all whom it may concern:*

Be it known that I, JOSEPH A. GREER, of the city and county of Galveston, and State of Texas, have invented certain new and useful Compounds for the Manufacture of Artificial Stone; and I do hereby declare the following to be a full, clear, and exact description of the invention, such as will enable others skilled in the art to which it appertains to make and use the same.

This invention relates to that class of compounds used in the manufacture of artificial stone; and it consists in composition formed by mixing certain materials in solution and treating them in further solutions, as follows: Take one hundred (100) pounds of hydraulic cement, four hundred (400) pounds of sharp sand, twenty (20) pounds of powdered magnesian limestone, one (1) pound of powdered charcoal, one (1) pound of black oxide of manganese. Then mix these thoroughly by passing first through a coarse and then through a fine sieve. Then make a solution of the following materials, to wit: thirty-two (32) gallons of water, three pounds of precipitate of carbonate of iron, one pound of carbonate of potassium, two pounds of sulphate of aluminum, two pounds of ferric oxide, and sixteen ounces of muriatic acid. Mix thoroughly and dampen the above-mentioned powder with it, using great care not to make the powder too damp. About one-eighth of the solution will be the right proportion. I now tamp into molds of desired form. When the stones are turned out of the molds I moisten them three times a day for five days with a solution consisting of one-fourth pound of carbonate of potassium and two gallons of water. When the stones are dry I coat them with the following solution: one-half pound of tallow, one-fourth pound of white wax, one-fourth pound of carbonate of potassium, and two gallons of water. Boil this solution until the ingredients are well dissolved and apply hot. After twenty-four hours coat with a solution compound of one gallon of water and one-half pound of sulphate of alumina. In twelve hours they are ready for use. Stone made in this way is very dense and impervious to water, and can be cut with a chisel, like any other rock. For any desired color, use in the first-named composition the mineral oxide corresponding in color to that desired. The last two named solutions may be applied with a flat brush.

What I claim as my invention, and desire to secure by Letters Patent, is—

1. As a basis or body for artificial stone, the combination of the following elements, viz: hydraulic cement, sharp sand, powdered magnesian limestone, powdered charcoal, and black oxide of manganese, in substantially the proportions specified, with the liquid compound or solution herein set forth.

2. The solution or liquid compound herein described for moistening and tempering cements and compounds for artificial stone, consisting of carbonate of iron, carbonate of potassium, sulphate of aluminum, ferric oxide, muriatic acid, and water in substantially the proportions set forth.

3. The solution herein described for waterproofing artificial stone, the same consisting of tallow, wax, carbonate of potassium, and water, treated in the manner described, and applied in substantially the manner set forth.

4. The solution herein described for hardening artificial stone, the same consisting of water and sulphate of alumina in the proportions set forth.

5. The method herein described of waterproofing and hardening artificial stone, the same consisting in coating or saturating the stone with a compound of tallow, wax, carbonate of potassium, and water, and after allowing the stone to dry then subjecting it to a solution of sulphate of alumina, as set forth.

In testimony that I claim the foregoing I have hereunto set my hand this 25th day of June, 1882.

JOSEPH A. GREER.

In presence of—
JAMES D. MOODY,
J. D. BRAMAN.